(12) United States Patent
Baldemair et al.

(10) Patent No.: US 8,923,232 B2
(45) Date of Patent: Dec. 30, 2014

(54) RESOURCE ORGANIZATION IN AN APPARATUS AND METHOD FOR CARRIER AGGREGATION

(75) Inventors: Robert Baldemair, Solna (SE); Dirk Gerstenberger, Stockholm (SE); Daniel Larsson, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 199 days.

(21) Appl. No.: 13/638,951

(22) PCT Filed: Apr. 4, 2011

(86) PCT No.: PCT/SE2011/050397
§ 371 (c)(1),
(2), (4) Date: Oct. 2, 2012

(87) PCT Pub. No.: WO2011/126435
PCT Pub. Date: Oct. 13, 2011

(65) Prior Publication Data
US 2013/0028216 A1    Jan. 31, 2013

Related U.S. Application Data

(60) Provisional application No. 61/321,265, filed on Apr. 6, 2010.

(51) Int. Cl.
  *H04W 4/00* (2009.01)
  *H04L 5/00* (2006.01)
  *H04L 27/26* (2006.01)
(52) U.S. Cl.
  CPC ............. *H04L 5/003* (2013.01); *H04L 5/001* (2013.01); *H04L 27/261* (2013.01)
  USPC ........................................................ 370/329

(58) Field of Classification Search
  None
  See application file for complete search history.

(56) References Cited

U.S. PATENT DOCUMENTS

| | | | | |
|---|---|---|---|---|
| 8,289,935 | B2* | 10/2012 | Frederiksen et al. | 370/337 |
| 8,559,381 | B2* | 10/2013 | Ojala et al. | 370/329 |
| 2009/0175233 | A1* | 7/2009 | Ojala et al. | 370/329 |
| 2009/0196240 | A1* | 8/2009 | Frederiksen et al. | 370/329 |
| 2009/0268685 | A1* | 10/2009 | Chen et al. | 370/329 |
| 2010/0172308 | A1* | 7/2010 | Nam et al. | 370/329 |
| 2010/0272022 | A1* | 10/2010 | Iwai et al. | 370/328 |
| 2010/0272048 | A1* | 10/2010 | Pan et al. | 370/329 |
| 2010/0284265 | A1* | 11/2010 | Ogawa et al. | 370/208 |
| 2010/0322324 | A1* | 12/2010 | Lindh et al. | 375/259 |
| 2012/0076028 | A1* | 3/2012 | Ko et al. | 370/252 |

(Continued)

OTHER PUBLICATIONS

3rd Generation Partnership Project. "LTE; Evolved Universal Terrestrial Radio Access (E-UTRA); Physical Layer Procedures (3GPP TS 36.213 version 9.0.1 Release 9)." Technical Specification, ETSI TS 136 213 V9.0.1, Jan. 2010, Sophia Antipolis Cedex, France.

*Primary Examiner* — Ayaz Sheikh
*Assistant Examiner* — Faiyazkhan Ghafoerkhan
(74) *Attorney, Agent, or Firm* — Coats & Bennett, PLLC

(57) ABSTRACT

Methods and apparatus for organizing reception on a channel by a user equipment are disclosed. A method includes determining a channel group based on a first physical resource block index of a physical uplink shared channel and a cyclic shift of uplink demodulation reference signals, without an offset value; determining a channel sequence based on the first physical resource block index, the cyclic shift, and the offset value; and determining a reception resource according to the channel group and the channel sequence.

16 Claims, 5 Drawing Sheets

(56) References Cited

U.S. PATENT DOCUMENTS

| | | | |
|---|---|---|---|
| 2012/0113831 A1* | 5/2012 | Pelletier et al. | 370/252 |
| 2012/0140724 A1* | 6/2012 | Sipola et al. | 370/329 |
| 2012/0320849 A1* | 12/2012 | Frederiksen et al. | 370/329 |
| 2013/0010742 A1* | 1/2013 | Han et al. | 370/329 |
| 2013/0022017 A1* | 1/2013 | Han et al. | 370/329 |

* cited by examiner

Aggregated bandwidth = 100 MHz

RESOURCE ORGANIZATION IN AN APPARATUS AND METHOD FOR CARRIER AGGREGATION

BACKGROUND

A Long Term Evolution (LTE) cellular radio communication system uses Orthogonal Frequency Division Multiple Access (OFDMA) in the downlink (evolved NodeBs to user equipments) and Discrete Fourier Transform (DFT)-spread OFDM in the uplink (user equipments to evolved NodeBs). The LTE system is an evolution of the widely deployed wideband code division multiple access (WCDMA) systems and is standardized by the Third Generation Partnership Project (3GPP) in Technical Specifications (TS)Series 36, generally Release 8 (Rel-8), and later Releases. An LTE system is sometimes also called the Evolved Universal Terrestrial Radio Access (E-UTRA) communication system.

The basic LTE physical resource can thus be seen as a time-frequency grid as illustrated in FIG. 1, where each resource element (RE) corresponds to one OFDM subcarrier and bandwidth of 15 kilohertz (kHz) during one OFDM symbol interval. Each OFDM symbol can have either a normal (short) or extended (long) cyclic prefix. In the time domain, LTE transmissions are organized into successive radio frames of length $T_{frame}$=10 milliseconds (ms), each radio frame consisting of ten equally-sized subframes of length $T_{subframe}$=1 ms, as depicted by FIG. 2.

Furthermore, the resource allocation in LTE is typically described in terms of physical resource blocks (PRBs or RBs), where a resource block corresponds to one slot (0.5 ms) in the time domain and 12 subcarriers, or tones, in the frequency domain. Resource blocks are numbered in the frequency domain, starting from 0 at one end of the system bandwidth. Each slot includes either six or seven OFDM symbols, depending on the length of the symbols' cyclic prefixes.

Uplink (UL) transmissions are dynamically scheduled, i.e., a Physical Downlink Control CHannel (PDCCH) in each subframe indicates if resources on a Physical Uplink Shared CHannel (PUSCH) are granted to a terminal, or user equipment (UE), for an UL transmission. If so, the resources granted are valid for subframe n+4 if the uplink grant has been transmitted in subframe n. This simple relation is valid for a Frequency Division Duplex (FDD) mode of operation; in a Time Division Duplex (TDD) mode, the fact that not all subframes are UL subframes has to be taken into account.

LTE uses hybrid Automatic Repeat Request (hybrid ARQ, or HARQ), where after receiving uplink data in a subframe, the evolved NodeB (eNB) attempts to decode it and reports to the terminal whether the decoding was successful (acknowledgement, or ACK) or not (non-acknowledgement, or NACK). In case of an unsuccessful decoding attempt, the terminal can retransmit the erroneous data.

PHICH:

The ACK or NACK indication is transmitted by an evolved NodeB (eNB) on a Physical Hybrid ARQ Indicator Channel (PHICH). For FDD mode, the PHICH is transmitted in subframe n+8 if uplink resources have been granted in subframe n and the UL transmission has been performed in subframe n+4. The overall transmission bandwidth is shared among terminals, i.e., within one subframe, multiple terminals can get uplink resources granted. In LTE, the primary multiple access scheme in the uplink is Frequency Division Multiple Access (FDMA), and therefore the LTE uplink transmission scheme is also referred to as Single Carrier-FDMA to account for both the single carrier property of DFT-spread OFDM as well as the selected multiple access system.

Besides FDMA, LTE can also provide Spatial Domain Multiple Access (SDMA), where multiple UEs are granted the same time-frequency resources, but for SDMA to work, the wireless channels of the terminals scheduled on the same resources must possess special properties. Furthermore, each UE must use orthogonal uplink DeModulation Reference Signals (DMRS), which are generated by cyclic shifting a common base sequence by different amounts. In the context of LTE, uplink SDMA is typically referred to as uplink Multi User Multiple Input Multiple Output (MU-MIMO).

If multiple terminals perform multiple PUSCH transmissions in the same subframe, the corresponding HARQ feedback transmissions occur in the same subframe four subframes later (in FDD). To avoid collisions, the resources on the PHICH are derived by the eNB from a first physical resource block index $I_{PRB\_RA}^{lowest\_index}$ of the PUSCH transmissions (which enables unique PHICH resources for FDMA) and the cyclic shift (CS) $n_{DMRS}$ of the uplink DMRS (unique resources for uplink MU-MIMO).

For dynamically scheduled transmissions, the eNB uses the following Eq. 1 to calculate a PHICH group $n_{PHICH}^{group}$ and PHICH sequence $n_{PHICH}^{seq}$, as specified in, for example, Clause 9.1.2 of 3GPP TS 36.213 V8.8.0, Physical layer procedures (Release 8) (September 2009). The PHICH group and sequence together determine a unique PHICH resource.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad (1)$$

in which $\lfloor x \rfloor$ indicates the floor function of x, i.e., the largest integer less than or equal to x, and the parameter $N_{PHICH}^{group}$ is the number of available PHICH groups, which can be derived from higher layer parameters, as described for example in Clause 6.9 of 3GPP TS 36.211 V9.1.0, Physical Channels and Modulation, Release 9 (December 2009). The parameter $N_{SF}^{PHICH}$ is the spreading factor (SF) size used for PHICH (e.g., 8 and 4 for normal and extended cyclic prefix, respectively), as specified in, for example, Clause 6.9.1 of 3GPP TS 36.211. The parameter $I_{PHICH}$ is 0 for FDD and 1 for some TDD transmissions, as described in Clause 9.1.2 of 3GPP TS 36.213.

Carrier Aggregation:

The LTE Rel-8 standard supports bandwidths up to 20 megahertz (MHz), but 3GPP has initiated work on LTE Release 10 (Rel-10) to meet the requirements of an IMT-Advanced system (i.e., a "fourth generation" (4G) system that uses an internet protocol (IP) multimedia subsystem (IMS) of an LTE, high speed packet access (HSPA), or other communication system for IMS multimedia telephony (IMT)). One of the parts of LTE Rel-10 is to support bandwidths larger than 20 MHz. One important requirement on LTE Rel-10 is to assure backward compatibility with LTE Rel-8, which includes spectrum compatibility. Thus, an LTE Rel-10 carrier that is wider than 20 MHz should appear as a number of LTE carriers to an LTE Rel-8 terminal. Each such carrier can be referred to as a Component Carrier (CC). In LTE Rel-10, CCs are also called (serving) cells, in particular Primary and Secondary cells.

In particular for early LTE Rel-10 deployments, it can be expected that there will be a small number of LTE Rel-10-capable terminals compared to many LTE legacy terminals. Therefore, it is necessary to assure an efficient use of a wide Rel-10 carrier also for legacy (Rel-8) terminals, i.e., it is possible to implement carriers where legacy terminals can be scheduled in all parts of a wideband LTE Rel-10 carrier. A straightforward way to obtain this would be by Carrier Aggregation (CA), in which an LTE Rel-10 terminal can receive multiple CCs, where the CCs have, or at least the possibility to have, the same structure as a Rel-8 carrier. CA is illustrated in FIG. 3, which depicts five CCs, each having a bandwidth of 20 MHz, that are aggregated to a combined bandwidth of 100 MHz.

The number of aggregated CCs as well as the bandwidths of the individual CCs may be different for uplink and downlink. In a symmetric configuration, the number of CCs in downlink is the same as the number of CCs in uplink, and in an asymmetric configuration, the numbers of CCs in the downlink and uplink are different. It is important to note that the number of CCs configured in a cell may be different from the number of CCs seen by a terminal. Thus, a terminal may for example support more downlink CCs than uplink CCs, even though the cell is configured with the same number of uplink and downlink CCs.

Depending on the exact configuration, uplink grants transmitted by an eNB on the PDCCH of one downlink CC can schedule multiple uplink CCs or just a single uplink CC.

FIG. 4 shows the case that PDCCH on one downlink CC schedules PUSCH transmissions on only a single uplink CC (RB=$I_{PRB\_RA}^{lowest\_index}$, CS=$n_{DMRS}$). In particular in FIG. 4, an UL grant 1 for RB1, CS1 transmitted on the PDCCH on a DL CC 200 prompts a PUSCH transmission, according to the received grant, on an UL CC 202 that is acknowledged by an ACK/NACK 1 transmission on the PHICH on the DL CC 200. Whether an ACK or a NACK is transmitted depends on the received RB1, CS1 PUSCH transmission. In a similar way, an UL grant 2 for RB2, CS2 transmitted on another DL CC 204 prompts a PUSCH transmission on an UL CC 206 that is acknowledged by an ACK/NACK 2 transmission on DL CC 204.

FIG. 5 shows the case that the PUSCH transmissions on multiple UL CCs can be scheduled from a PDCCH on a single downlink CC (RB=$I_{PRB\_RA}^{lowest\_index}$, CS=$n_{DMRS}$). In particular in FIG. 5, an UL grant 1 for RB1, CS1 transmitted on a DL CC 210 prompts a PUSCH transmission on an UL CC 212 that is acknowledged by an ACK/NACK 1 transmission on the DL CC 210, and an UL grant 2 for RB2, CS2 transmitted on the DL CC 210 prompts a PUSCH transmission on an UL CC 214 that is acknowledged by an ACK/NACK 2 transmission on the DL CC 210.

The PHICH of a PUSCH transmission takes place on the same CC that has been used to transmit the uplink grant. In the case shown in FIG. 4, no PHICH collisions can occur. In the case shown in FIG. 5, PHICH collisions can occur. Assuming that in FIG. 5 PUSCH transmissions on both CCs start with the same first uplink resource block $I_{PRB\_RA}^{lowest\_index}$ and use the same cyclic shift $n_{DMRS}$ for the uplink DMRS, the same PHICH resources are going to be used according to Eq. (1), resulting in a PHICH collision.

To mitigate this problem, an offset can be added to the resource block numbering of a CC. A special case thereof is to number the resource blocks contiguously across CCs, i.e., on the first UL CC, RBs are numbered from 0 to $N_{RB}^{UL,CC1}-1$; on the second CC, RBs are numbered from $N_{RB}^{UL,CC1}$ to $N_{RB}^{UL,CC1}+N_{RB}^{UL,CC2}-1$; etc. Nevertheless, contiguous numbering can be seen as a special case of the more general idea to offset the resource block numbering on each CC by a CC-specific offset $os_{CCn}$, i.e., to use $I_{PRB\_RA}^{lowest\_index}+os_{CCn}$ instead of $I_{PRB\_RA}^{lowest\_index}$ in Eq. (1) to calculate PHICH resources for PUSCH transmission on CC n. With this transformation, the PHICH resource assignment formula of Eq. (1) effectively becomes:

$$n_{PHICH}^{group}=(I_{PRB\_RA}^{lowest\_index}+os_{CCn}+n_{DMRS}) \bmod N_{PHICH}^{group}+I_{PHICH}N_{PHICH}^{group}$$

$$n_{PHICH}^{seq}=(\lfloor(I_{PRB\_RA}^{lowest\_index}+os_{CCn})/N_{PHICH}^{group}\rfloor+n_{DMRS}) \bmod 2N_{SF}^{PHICH} \quad (2)$$

for CC n.

The solution outlined by Eq. (2) may not be necessary for dynamically scheduled transmissions since there the cyclic shift $n_{DMRS}$ of uplink DMRS can be used to generate unique PHICH resources for different CCs. However, for semi-persistent scheduled transmissions, $n_{DMRS}$ is always set to 0, requiring a modification to the PHICH resource calculation, with Eq. (2) being one example.

While Eq. (2) works to avoid PHICH collisions, it complicates scheduling since it modifies both the PHICH group $n_{PHICH}^{group}$ as well as the PHICH sequence $n_{PHICH}^{seq}$. A modification of $n_{PHICH}^{group}$ is however not needed since all possible $n_{PHICH}^{group}$ can be reached even with the unmodified resource block numbering from 0 to $N_{RB}^{UL,CCn}-1$. For example, looking at FDD (where $I_{PHICH}$ is always zero) with normal cyclic prefix, the maximum number of PHICH groups is ceil($N_{RB}^{DL}/4$) according to 3GPP TS 36.211. Ceil(x) is the ceiling function of x, i.e., the smallest integer greater than or equal to x. Assuming for simplicity $N_{RB}^{UL,CCn}=N_{RB}^{DL}$ (i.e., the same uplink and downlink bandwidth for CC n), each PHICH group is visited four times when varying the resource block index $I_{PRB\_RA}^{lowest\_index}$ from 0 to $N_{RB}^{UL,CCn}-1$ in Eq. (1).

The problem however is the PHICH sequence number $n_{PHICH}^{seq}$. Assuming again FDD with normal cyclic prefix and semi-persistent scheduling (i.e., $n_{DMRS}=0$), we see from Eq. (1) that the highest possible PHICH sequence number is $n_{PHICH}^{seq}=$floor($(N_{RB}^{UL}-1)$/ceil($N_{RB}^{UL}/4$)) mod $2N_{SF}^{PHICH}=3$, in which floor(x) is the above-described floor function of x. Thus, the higher PHICH sequences 4 to 7 (normal cyclic prefix) can never be reached.

SUMMARY

The problems described above are solved by methods and apparatus in accordance with this invention. Unique downlink resources for transmissions in response to uplink transmissions on multiple uplink carriers scheduled from the same downlink carrier are provided. This is simpler for a network node to handle compared to prior systems.

In accordance with aspects of this invention, there is provided a method in a network node of determining communication resources on a downlink channel from the network node to a user equipment in a wireless communication network. The method includes determining a channel group based on a first physical resource block index of a transmission on a physical uplink shared channel (PUSCH) by the user equipment and on a cyclic shift of uplink demodulation reference signals (DMRS) transmitted by the user equipment, without an offset value; determining a channel sequence based on the first physical resource block index, the cyclic shift, and an offset value; and determining the communication resources on the downlink channel based on the channel group and the channel sequence.

Also in accordance with aspects of this invention, there is provided a method in a user equipment of determining communication resources on a downlink channel from a network node to the user equipment in a wireless communication network. The method includes determining a channel group based on a first physical resource block index of a transmission on a PUSCH by the user equipment and on a cyclic shift of uplink DMRS transmitted by the user equipment, without an offset value; determining a channel sequence based on the first physical resource block index, the cyclic shift, and an offset value; and determining the communication resources on the downlink channel based on the channel group and the channel sequence.

Also in accordance with aspects of this invention, there is provided an arrangement in a network node for determining communication resources on a downlink channel from the network node to a user equipment in a wireless communication network. The arrangement includes an electronic processor circuit configured for determining a channel group based on a first physical resource block index of a transmission on a PUSCH by the user equipment and on a cyclic shift of uplink DMRS transmitted by the user equipment, without an offset value; for determining a channel sequence based on the first physical resource block index, the cyclic shift, and an offset value; and for determining the communication resources on the downlink channel based on the channel group and the channel sequence.

Also in accordance with aspects of this invention, there is provided an arrangement in a user equipment for determining communication resources on a downlink channel from a network node to the user equipment in a wireless communication network. The arrangement includes an electronic processor circuit configured for determining a channel group based on a first physical resource block index of a transmission on a PUSCH by the user equipment and on a cyclic shift of uplink DMRS transmitted by the user equipment, without an offset value; for determining a channel sequence based on the first physical resource block index, the cyclic shift, and an offset value; and for determining the communication resources on the downlink channel based on the channel group and the channel sequence.

BRIEF DESCRIPTION OF THE DRAWINGS

The several objects, features, and advantages of this invention will become apparent by reading this description in conjunction with the drawings, in which.

DETAILED DESCRIPTION

Figure 1:
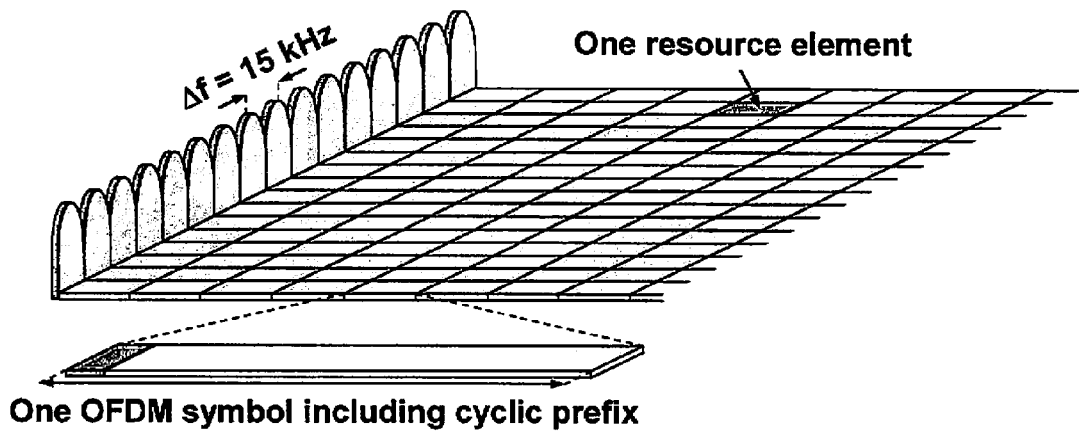
FIG. 1 is a time-frequency grid that illustrates a physical resource in a Long Term Evolution communication system.
Figure 2:
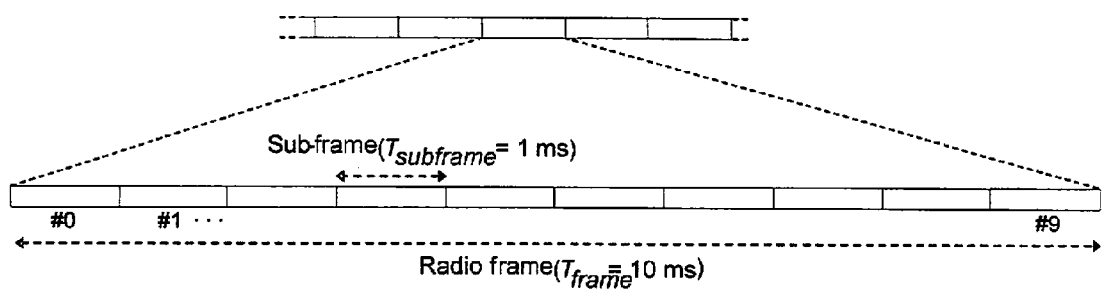
FIG. 2 depicts an arrangement of frames and sub-frames in a Long Term Evolution communication system.
Figure 3:
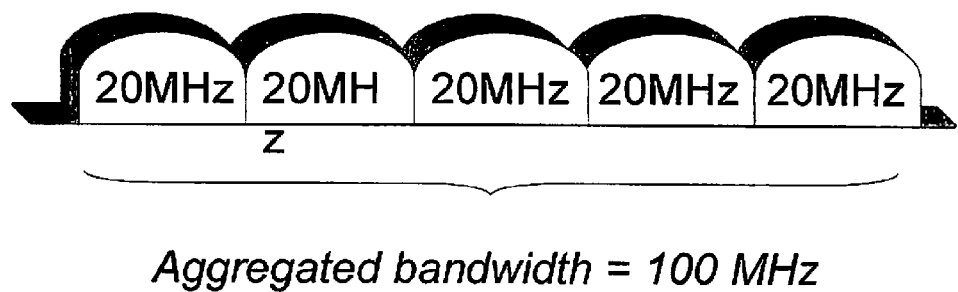
FIG. 3 depicts aggregation of component carriers.
Figure 4:
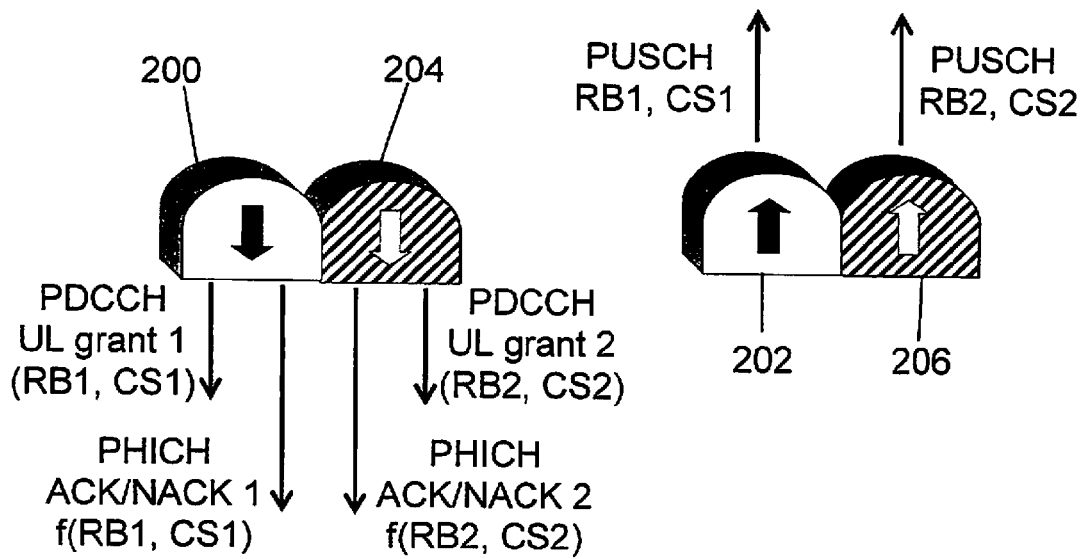
FIG. 4 depicts scheduling by one downlink component carrier of transmissions on one uplink component carrier.
Figure 5:
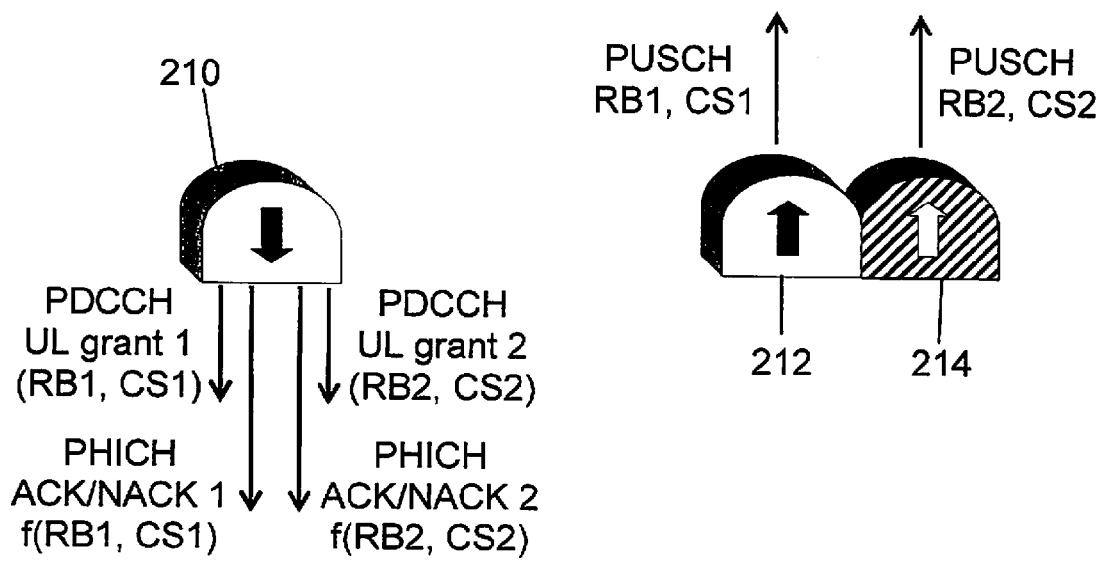
FIG. 5 depicts scheduling by one downlink component carrier of transmissions on multiple uplink component carriers.

The inventors have recognized that instead of adding an offset to the resource block numbering $I_{PRB\_RA}^{lowest\_index}$, which modifies both the PHICH group $n_{PHICH}^{group}$ and the PHICH sequence $n_{PHICH}^{seq}$, an offset can be added to only the PHICH sequence calculation. Thus, in accordance with this invention, Eq. (1) can be changed into the following Eq. (3):

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + os_{PHICH}^{seq,n}) \bmod 2N_{SF}^{PHICH} \quad (3)$$

with $os_{PHICH}^{seq,n}$ being the offset parameter of CC n, and the other parameters as defined above. It will be noted that the offset value $os_{PHICH}^{seq,n}$ is not simply a resource block number offset as in Eq. 2. As described above, the channel sequence and the channel group together determine a unique PHICH resource.

The parameter $os_{PHICH}^{seq,n}$ can be semi-statically configured, which is to say that the parameter is chosen by an eNB and signaled from the eNB to a UE via radio resource control (RRC) signaling messages, which are specified by, for example, 3GPP TS 36.331 V8.8.0, Evolved Universal Terrestrial Radio Access (E-UTRA) Radio Resource Control (RRC), Protocol Specification (Release 8) (December 2009). Alternatively, $os_{PHICH}^{seq,n}$ can be derived independently by an eNB and UE from the CC index n of the CC on which the PUSCH transmission takes place, which is to say that the offset parameter is a function of the CC index n, e.g., $os_{PHICH}^{seq,n} = n$. In the alternative of semi-persistent scheduling, the offset parameter can be chosen by and signaled from an eNB to a UE during scheduling set up by PDCCH signaling. For semi-persistent scheduling, Eq. (3) reduces to the following Eq. (4):

$$n_{PHICH}^{group} = (I_{PRB\_RA}^{lowest\_index}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + os_{PHICH}^{seq,n}) \bmod 2N_{SF}^{PHICH} \quad (4)$$

since here $n_{DMRS} = 0$.

A reasonable set of values for $os_{PHICH}^{seq,n}$ is currently believed to be 0 to $2N_{SF}^{PHICH} - 1$ (normal cyclic prefix) since the PHICH sequence $n_{PHICH}^{seq}$ is bound to this range. Table 1 below shows the available values $os_{PHICH}^{seq,n}$ together with an index pointer for normal cyclic prefix.

TABLE 1

| Offset values | |
|---|---|
| Index pointer | $os_{PHICH}^{seq,n}$ |
| 0 | 0 |
| 1 | 1 |
| 2 | 2 |
| 3 | 3 |
| 4 | 4 |
| 5 | 5 |
| 6 | 6 |
| 7 | 7 |

Depending on whether the offset value is signaled by an eNB to a UE or is determined by the UE itself, the index pointer can be signaled or be the outcome of a rule. The offset value can be included in the uplink grant message or in one or more grant messages that set up semi-persistent scheduling, or can be set semi-statically via RRC signaling.

The example of Table 1 has eight values defined if $os_{PHICH}^{seq,n}$ should be able to take all values from 0 to $2N_{SF}^{PHICH} - 1$. If only a subset of these values is defined for $os_{PHICH}^{seq,n}$, a smaller table is sufficient. It will also be noted that if $os_{PHICH}^{seq,n}$ can take all values, such a table is not really needed since the value of the index pointer can be identical to the offset $os_{PHICH}^{seq,n}$.

For the extended cyclic prefix, the complete range for $os_{PHICH}^{seq,n}$ is 0 to $N_{SF}^{PHICH}-1$. Also here it is possible to define a subset thereof for valid values of $os_{PHICH}^{seq,n}$.

Embodiments of this invention enjoy a number of advantages over prior systems and methods. The above-described modification to the PHICH resource calculation provides unique PHICH resources for PUSCH on multiple uplink CCs scheduled from the same downlink CC while modifying only the PHICH sequence calculation. This is simpler for an eNB to handle in its scheduler compared to prior systems and methods that modify both the PHICH group and the PHICH sequence calculation.

Figure 6:
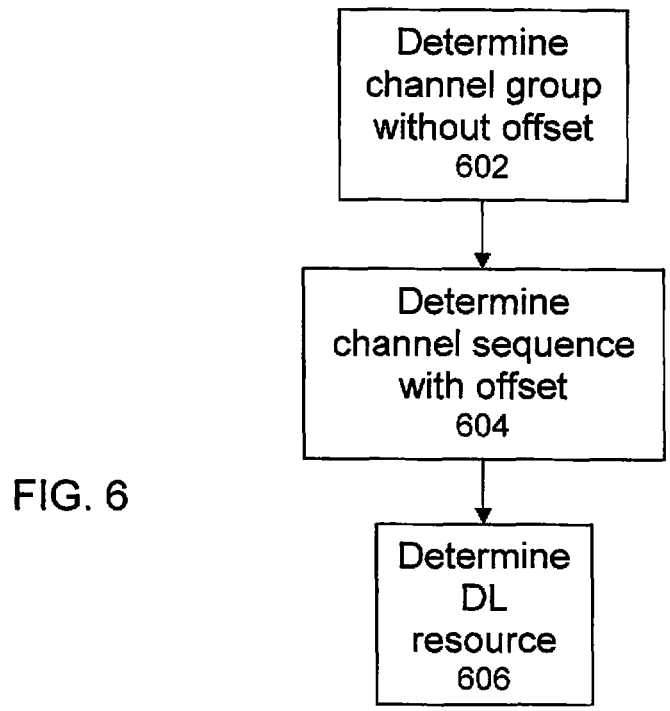
FIG. 6 is a flow chart of a method of determining communication resources on a channel in a communication network.

FIG. 6 is a flow chart of a method of determining communication resources on a downlink channel, such as the PHICH, between a network node, such as an eNB, and a UE in a wireless communication network. The method as depicted in FIG. 6 is substantially the same when carried out by an eNB and a UE because both the eNB and the UE have to determine the same PHICH resources. The eNB has to determine the PHICH resources so the eNB can send it, and the UE also has to determine the PHICH resources so the UE can receive it. The eNB can readily determine the PHICH resource as it already has all the necessary information for Eq. 3 or Eq. 4, and the UE can determine the PHICH resource as it already has most of the necessary information and can have or can be provided with the offset value.

In step 602, the eNB or UE determines a channel group based on (1) a first physical resource block index of a PUSCH transmission by the UE and on (2) a cyclic shift of uplink DMRS, without an offset value, unlike prior methods and systems. In step 604, the eNB or UE determines a channel sequence based on the first physical resource block index, the cyclic shift, and the offset value. As described above, the eNB can determine the offset value that can be in a range from zero to twice a spreading factor of the downlink channel, i.e., 0 to $2N_{SF}^{PHICH}-1$. In step 606, the eNB or UE determines the downlink channel communication resources, such as PHICH resources, based on the channel group and the channel sequence. As described above, the offset value can correspond to a component carrier index of a PUSCH transmission from the UE to an eNB For example, the offset value can be a function of the component carrier index. Also as described above, the offset value can be transmitted by the eNB to the UE in a suitable message, and the UE can receive a message including the offset value transmitted by the eNB. The PHICH resources can be determined according to Eqs. 3 or 4 above.

Figure 7:
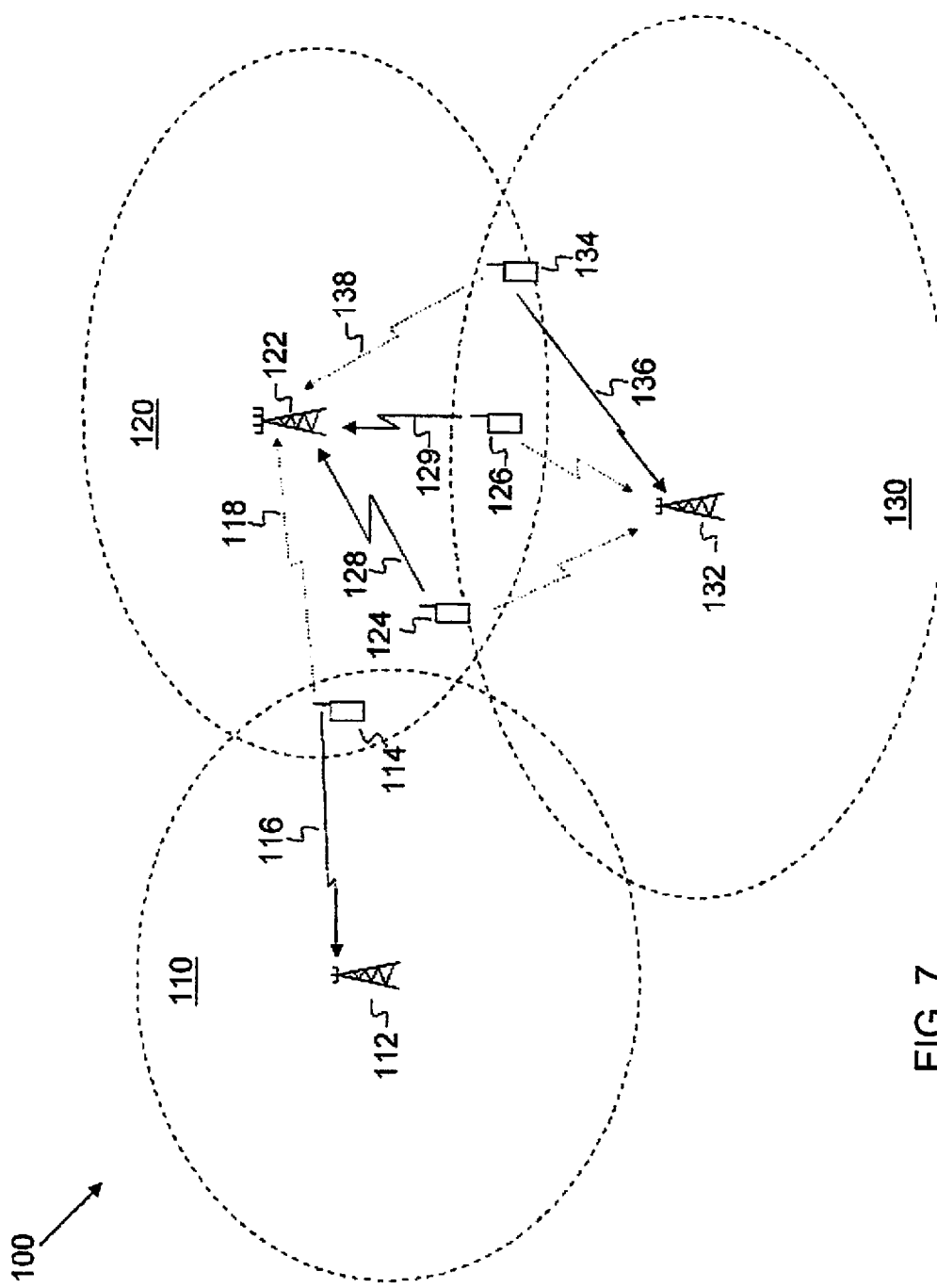
FIG. 7 illustrates a wireless communication system.

FIG. 7 is a diagram that illustrates an example of an LTE communication network 100 comprising three cells 110, 120, 130 that are managed by eNBs 112, 122, 132, respectively. Each eNB, or network node, communicates with zero, one, or more UEs located within the coverage area of the cell managed by that eNB. For instance, FIG. 7 depicts a UE 114 located in cell 110 that is in communication with the eNB 112 as indicated by the arrow 116. UEs 124, 126 are located in cell 120 and communicate with eNB 122, as indicated by the arrows 128 and 129, respectively. UE 134 located in cell 130 communicates with eNB 132, as indicated by the arrow 136. As illustrated in FIG. 7 due to their locations, the UE 114 can also communicate with the eNB 122 as indicated by the arrow 118, the UE 134 can also communicate with the eNB 122 as indicated by the arrow 138, and the UEs 124, 126 can also communicate with the eNB 132. The network nodes 112, 122, 132 are also connected to one another over a transport network (not shown) that can use point-to-point microwave connections, or fiber optic cables, or other communication links. The eNBs and UEs determine and use communication resources as described above.

Figure 8:
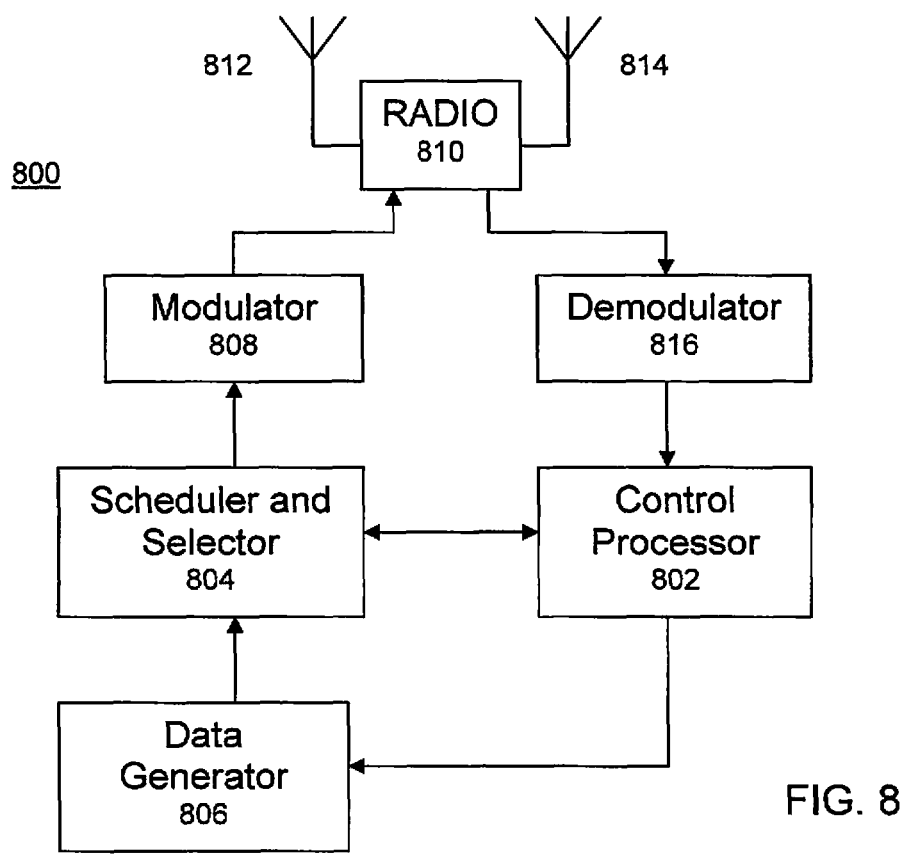
FIG. 8 is a block diagram of an arrangement in a network node, such as an evolved NodeB.

FIG. 8 is a block diagram of a portion of an eNB 800, which is typical of base stations and other such transmitting nodes in a network that can communicate with UEs by implementing the methods described above. It will be appreciated that the functional blocks depicted in FIG. 8 can be combined and re-arranged in a variety of equivalent ways, and that many of the functions can be performed by one or more suitably programmed digital signal processors and other known electronic circuits.

The eNB 800 is operated by a control processor 802, which typically and advantageously is a suitably programmed digital signal processor circuit. The control processor 802 typically provides and receives control and other signals from various devices in the eNB 800. For simplicity in FIG. 8, the control processor 802 is shown exchanging information with a scheduler and selector 804, which receives digital words to be transmitted to respective UEs or to be broadcast from a suitable data generator 806. In accordance with commands from the control processor 802, the scheduler and selector 804 implements RB and RE scheduling and selection in an LTE system, for example, and implements code allocation in a WCDMA/HSPA system, for example. In particular, the control processor and scheduler cooperate to generate and transmit ACK/NACK messages on PHICH according to the methods and techniques described above.

The control processor 802 is configured to monitor the load on the eNB, and to generate uplink grant messages and optionally messages that signal PHICH sequence offset values to UEs. The control processor is further configured to determine a channel group based on a first physical resource block index of a PUSCH and a cyclic shift of uplink DMRS, without an offset value; to determine a channel sequence based on the first physical resource block index, the cyclic shift, and the offset value; and to determine a downlink resource, such as a PHICH resource, according to the channel group and the channel sequence. The load can be determined for example simply by counting the RBs and REs to be transmitted in a sub-frame, frame, or group of them. A processor such as the control processor 802 can also be configured as a traffic analyzer that determines the load on the eNB by monitoring the eNB buffer status, e.g., how much data is waiting for available bandwidth to be transmitted to all connected UES in relation to the number of RBs and REs being and recently transmitted. The load on the eNB can also be determined based on the number of its connected UEs, or in a WCDMA, HSPA, or equivalent system, based on the number of allocated channelization codes.

Information from the scheduler and selector 804 is provided to a modulator 808 that uses the information to generate a modulation signal suitable for the particular communication system. For example, the modulator 808 in an LTE system is an OFDM modulator. The modulation signal generated by the modulator 808 is provided to a suitable radio circuit 810 that generates a wireless signal that is transmitted through at least one transmit antenna 812. Wireless signals transmitted by UEs are captured by at least one receive antenna 814 that provides those signals to the radio 810 and a demodulator 816. The artisan will understand that the same antenna can be used for transmission and reception.

As described above, the radio 810 and demodulator 816 are configured to receive and demodulate at least a PUSCH signal and uplink DMRS, and the control processor 802 is configured to determine a channel group based on a first physical resource block index of the PUSCH signal and a cyclic shift of the uplink DMRS, without an offset value; to determine a channel sequence based on the first physical resource block index, the cyclic shift, and the offset value; and to determine a downlink resource, such as a PHICH resource, according to the channel group and the channel sequence, i.e., according to Eqs. 3 or 4.

It will be understood that the control processor 802 can be configured such that it includes one or more other devices depicted in FIG. 8, which can be implemented by dedicated programmed processors or other suitable logic configured to perform their functions. The combination of the data generator 806, scheduler and selector 804, and modulator 808 produces DL frames or sub-frames to be transmitted. The modulator 808 converts the information into modulation symbols that are provided to the radio 810, which impresses the modulation symbols on one or more suitable carrier signals. In an LTE system for example, the radio 810 impresses the modulation symbols on a number of OFDM subcarriers. The modulated subcarrier signals are transmitted through the antenna 812.

Figure 9:
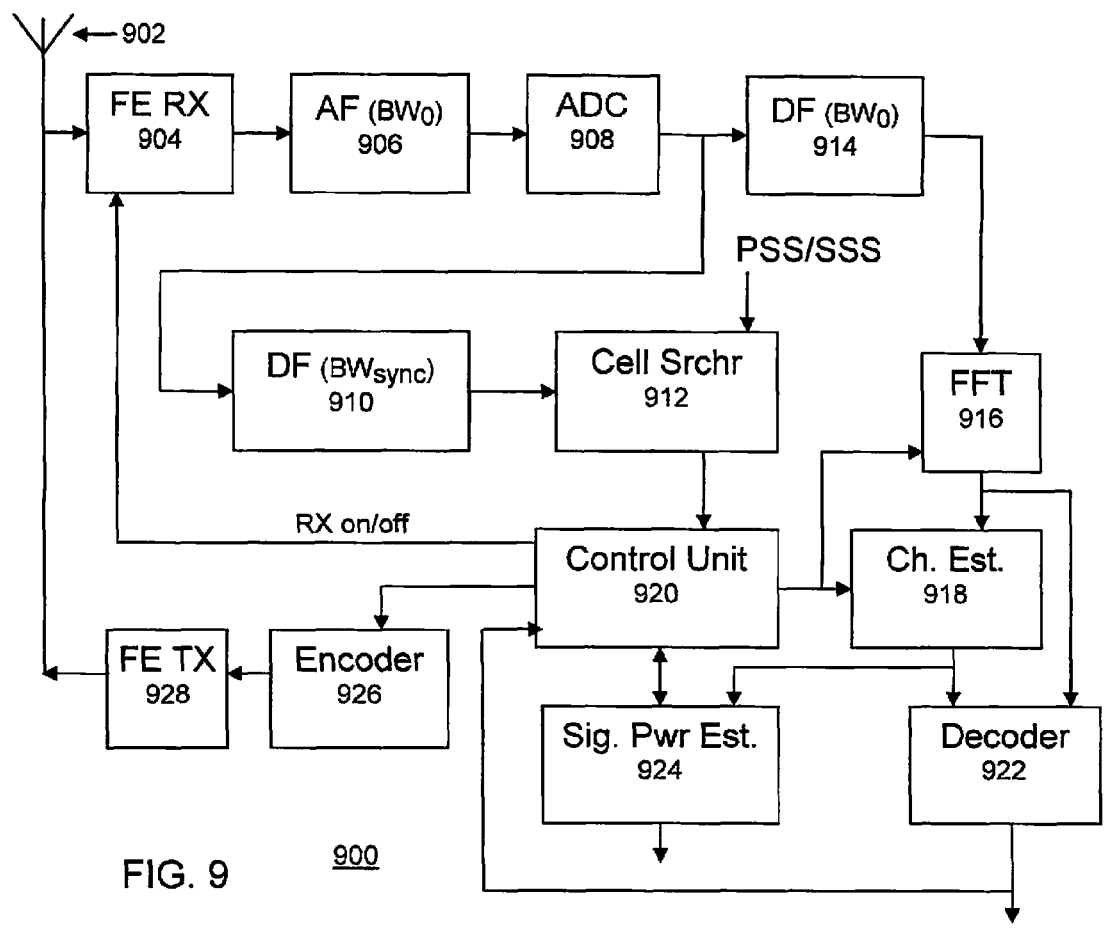
FIG. 9 is a block diagram of an arrangement in a user equipment.

FIG. 9 is a block diagram of an arrangement in a UE 900 that can implement the methods described above. It will be appreciated that the functional blocks depicted in FIG. 9 can be combined and re-arranged in a variety of equivalent ways, and that many of the functions can be performed by one or more suitably programmed digital signal processors. Moreover, connections among and information provided or exchanged by the functional blocks depicted in FIG. 9 can be altered in various ways to enable a UE to implement other methods involved in the operation of the UE.

As depicted in FIG. 9, the UE 900 receives a DL radio signal through an antenna 902 and typically down-converts the received radio signal to an analog baseband signal in a front end receiver (Fe RX) 904. The baseband signal is spectrally shaped by an analog filter 906 that has a bandwidth $BW_0$, and the shaped baseband signal generated by the filter 906 is converted from analog to digital form by an analog-to-digital converter (ADC) 908.

The digitized baseband signal is further spectrally shaped by a digital filter 910 that has a bandwidth $BW_{sync}$, which corresponds to the bandwidth of synchronization signals. The shaped signal generated by the filter 910 is provided to a cell search unit 912 that carries out one or more methods of searching for cells as specified for the particular communication system, e.g., LTE. Typically, such methods involve detecting predetermined primary and/or secondary synchronization signals (P/SSS) in the received signal.

The digitized baseband signal is also provided by the ADC 908 to a digital filter 914 that has the bandwidth $BW_0$, and the filtered digital baseband signal is provided to a processor 916 that implements a fast Fourier transform (FFT) or other suitable algorithm that generates a frequency-domain (spectral) representation of the baseband signal. A channel estimation unit 918 receives signals from the processor 916 and generates a channel estimate for each of several subcarriers based on control and timing signals provided by a control unit 920, which also provides such control and timing information to the processor 916.

The estimator 918 provides the channel estimates to a decoder 922 and a signal power estimation unit 924. The decoder 922, which also receives signals from the processor 916, is suitably configured to extract information from the DL radio signal, including uplink grant, RRC, PHICH, and other DL messages as described above and typically generates signals subject to further processing in the UE (not shown). The estimator 924 generates received signal power measurements (e.g., estimates of reference signal received power (RSRP), received subcarrier power, signal to interference ratio (SIR), etc.). The estimator 924 can generate estimates of RSRP, reference signal received quality (RSRQ), received signal strength indicator (RSSI), received subcarrier power, SIR, and other relevant measurements, in various ways in response to control signals provided by the control unit 920. Power estimates generated by the estimator 924 are typically used in further signal processing in the UE. The estimator 924 (or the searcher 912, for that matter) is configured to include a suitable signal correlator.

In the arrangement depicted in FIG. 9, the control unit 920 keeps track of substantially everything needed to configure the searcher 912, processor 916, estimation unit 918, and estimator 924. For the estimation unit 918, this includes both method and cell identity (for reference signal extraction and cell-specific scrambling of reference signals). Communication between the searcher 912 and the control unit 920 includes cell identity and, for example, cyclic prefix configuration.

The control unit 920 can determine which of several possible estimation methods is used by the estimator 918 and/or by the estimator 924 for measurements on the detected cell(s). In addition, the control unit 920 can receive information signaled by the network and can control the on/off times of the Fe RX 904.

The control unit 920 provides appropriate information to an encoder 926, which generates modulation symbols or similar information that is provided to a transmitter front-end (FE TX) 928, which generates a transmission signal appropriate to the communication system. As depicted in FIG. 9, the transmission signal is provided to the antenna 902. The control unit 920 with the encoder 926 is suitably configured to generate PUSCH, RRC, and other signals and messages sent by the UE to an eNB.

The control unit 920 thus constitutes an arrangement in the UE that is configured for determining communication resources on a downlink channel, such as the PHICH, from an eNB to the UE as described above. The control unit is configured for determining a channel group based on a first physical resource block index of a transmission on a PUSCH by the UE and on a cyclic shift of DMRS transmitted by the UE, without an offset value; for determining a channel sequence based on the first physical resource block index, the cyclic shift, and an offset value; and for determining the communication resources on the downlink channel based on the channel group and the channel sequence, i.e., according to Eqs. 3 or 4.

The control unit and other blocks of the UE can be implemented by one or more suitably programmed electronic processors, collections of logic gates, etc. that processes information stored in one or more memories. As noted above, the UE includes memory or other information storage functionality suitable for carrying out the methods and receiving and generating the signals described above in cooperation with the control unit and software executed by the control unit. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits).

It will be appreciated that procedures described above are carried out repetitively as necessary, for example, to respond to the time-varying nature of communication channels between transmitters and receivers. In addition, this description is written in terms of channels such as the PHICH, but it will be understood that other channels can also be suitable.

It will also be appreciated that many aspects of this invention are described in terms of sequences of actions that can be performed by, for example, elements of a programmable computer system. This invention can be considered to be embodied entirely within any form of computer-readable storage medium having stored therein an appropriate non-transitory set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

The invention claimed is:

1. A method of determining, in a network node, communication resources on a downlink channel from the network node to a user equipment in a wireless communication network, the method comprising:
   determining a channel sequence based on an offset value, a first physical resource block index of a transmission on a physical uplink shared channel (PUSCH) by the user equipment, and on a cyclic shift of uplink demodulation reference signals (DMRS) transmitted by the user equipment;
   determining a channel group without the offset value and based on the first physical resource block index and the cyclic shift; and
   determining the communication resources on the downlink channel based on the channel group and the channel sequence;
   wherein determining the channel group and the channel sequence comprises determining the channel group and the channel sequence according to:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) + os_{PHICH}^{seq,n}) \bmod 2N_{SF}^{PHICH}$$

in which $n_{PHICH}^{group}$ represents the channel group, $n_{PHICH}^{seq}$ represents the channel sequence, $I_{PRB\_RA}^{lowest\_index}$ represents the first physical resource block index, $n_{DMRS}$ represents the cyclic shift, $N_{PHICH}^{group}$ represents a number of available channel groups, $I_{PHICH}$ is either zero or unity, $N_{SF}^{PHICH}$ represents a spreading factor of the downlink channel, and $os_{PHICH}^{seq,n}$ represents the offset value.

2. The method of claim 1, further comprising determining the offset value, wherein the offset value is in a range from zero to twice a spreading factor of the downlink channel.

3. The method of claim 2, wherein determining the offset value comprises determining the offset value based on an index of a component carrier where the transmission on the PUSCH takes place.

4. The method of claim 1, further comprising transmitting the offset value to the user equipment.

5. A method of determining, in a user equipment in a wireless communication network, communication resources on a downlink channel from a network node to the user equipment, the method comprising:
   determining a channel sequence based on an offset value, on a first physical resource block index of a transmission on a physical uplink shared channel (PUSCH) by the user equipment, and on a cyclic shift of uplink demodulation reference signals (DMRS) transmitted by the user equipment;
   determining a channel group without the offset value and based on the first physical resource block index and the cyclic shift; and
   determining the communication resources on the downlink channel based on the channel group and the channel sequence;
   wherein determining the channel group and channel sequence comprises determining the channel group and the channel sequence according to:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) + os_{PHICH}^{seq,n}) \bmod 2N_{SF}^{PHICH}$$

in which $n_{PHICH}^{group}$ represents the channel group, $n_{PHICH}^{seq}$ represents the channel sequence, $I_{PRB\_RA}^{lowest_{index}}$ represents the first physical resource block index, $n_{DMRS}$ represents the cyclic shift, $N_{PHICH}^{group}$ represents a number of available channel groups, $I_{PHICH}$ is either zero or unity, $N_{SF}^{PHICH}$ represents a spreading factor size used for channel transmissions, and $os_{PHICH}^{seq,n}$ represents the offset value.

6. The method of claim 5, wherein the offset value comprises a value in a range from zero to twice a spreading factor of the downlink channel.

7. The method of claim 5, wherein the offset value is based on an index of a component carrier where the transmission on the PUSCH takes place.

8. The method of claim 5, further comprising receiving the offset value from the network node.

9. An arrangement in a network node for determining communication resources on a downlink channel from the network node to a user equipment in a wireless communication network, the arrangement comprising an electronic processor circuit configured to:
   determine a channel sequence based on an offset value, on a first physical resource block index of a transmission on a physical uplink shared channel (PUSCH) by the user equipment, and on a cyclic shift of uplink demodulation reference signals (DMRS) transmitted by the user equipment;
   determine a channel group without the offset value and based on the first physical resource block index and the cyclic shift; and determine the communication resources on the downlink channel based on the channel group and the channel sequence;
wherein the electronic processing circuit is configured to determine the channel group and channel sequence according to:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) + os_{PHICH}^{seq,n}) \bmod 2N_{SF}^{PHICH}$$

in which $n_{PHICH}^{group}$ represents the channel group, $n_{PHICH}^{seq}$ represents the channel sequence, $I_{PRB\_RA}^{lowest_{index}}$ represents the first physical resource block index, $n_{DMRS}$ represents the cyclic shift, $N_{PHICH}^{group}$ represents a number of available channel groups, $I_{PHICH}$ is either zero or unity, $N_{SF}^{PHICH}$ represents a spreading factor of the downlink channel, and $os_{PHICH}^{seq,n}$ represents the offset value.

10. The arrangement of claim 9, wherein the network node determines the offset value, and wherein the offset value comprises a value in a range from zero to twice a spreading factor of the downlink channel.

11. The arrangement of claim 9, wherein the offset value is determined based on an index of a component carrier where the PUSCH transmission takes place.

12. The arrangement of claim 9, wherein the arrangement further comprises a radio circuit configured to transmit the offset value to the user equipment.

13. An arrangement in a user equipment for determining communication resources on a downlink channel from a network node to the user equipment in a wireless communication network, the arrangement comprising an electronic processor circuit configured to:
determine a channel sequence based on an offset value, on a first physical resource block index of a transmission on a physical uplink shared channel (PUSCH) by the user equipment, and on a cyclic shift of uplink demodulation reference signals (DMRS) transmitted by the user equipment;
determine a channel group without the offset value and based on the first physical resource block index and the cyclic shift; and
determine the communication resources on the downlink channel based on the channel group and the channel sequence;
wherein the electronic processor circuit is configured to determine the channel group and channel sequence according to:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) + os_{PHICH}^{seq,n}) \bmod 2N_{SF}^{PHICH}$$

in which $n_{PHICH}^{group}$ represents the channel group, $n_{PHICH}^{seq}$ represents the channel sequence, $I_{PRB\_RA}^{lowest_{index}}$ represents the first physical resource block index, $n_{DMRS}$ represents the cyclic shift, $N_{PHICH}^{group}$ represents a number of available channel groups, $I_{PHICH}$ is either zero or unity, $N_{SF}^{PHICH}$ represents a spreading factor size used for channel transmissions, and $os_{PHICH}^{seq,n}$ represents the offset value.

14. The arrangement of claim 13, wherein the offset value comprises a value in a range from zero to twice a spreading factor of the downlink channel.

15. The arrangement of claim 13, wherein the offset value is based on an index of a component carrier where the transmission on the PUSCH takes place.

16. The arrangement of claim 13, further comprising a radio configured to receive the offset value from the network node.

\* \* \* \* \*